Feb. 8, 1949.　　　J. M. TABOR ET AL　　　2,461,300
METHOD OF CONDITIONING A HARD
SOAP FOR SOLVENT EXTRACTION
Filed Aug. 1, 1945　　　3 Sheets-Sheet 3
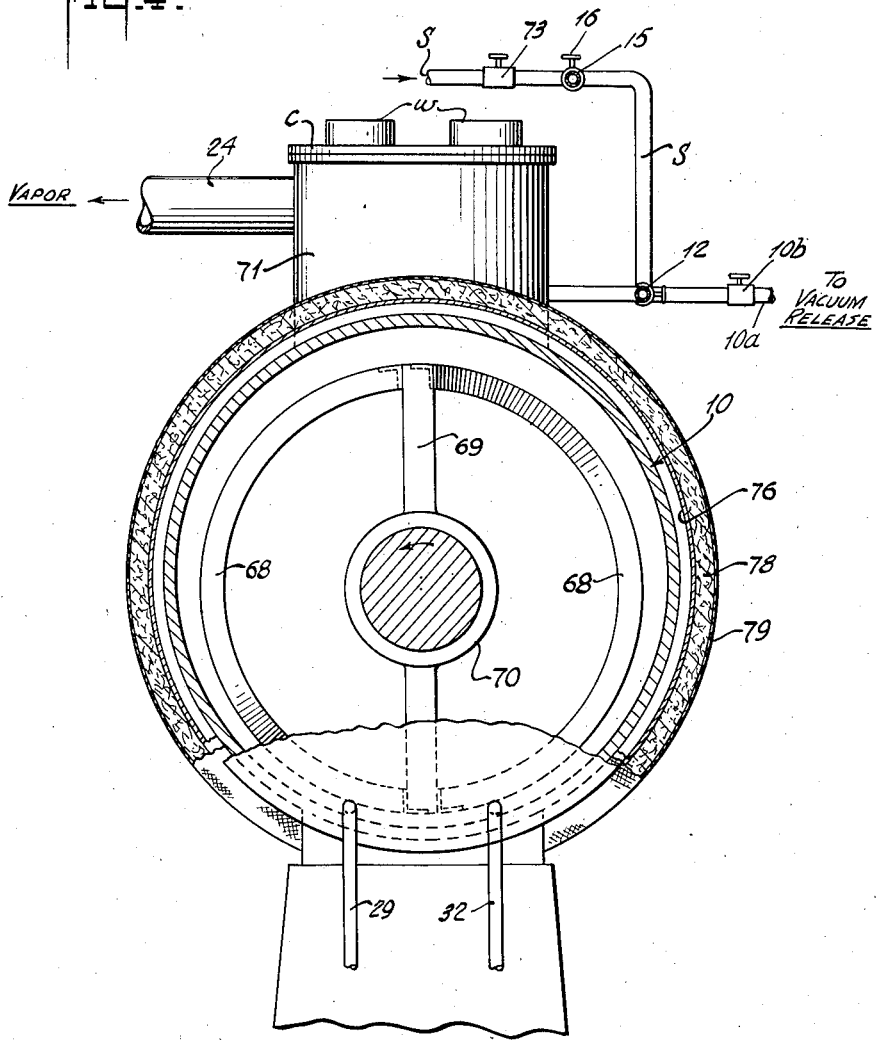
INVENTORS
JOSEPH M. TABOR.
HOWARD F. SIEBERT.
PAUL R. FROHRING.
BY
ATTORNEY.

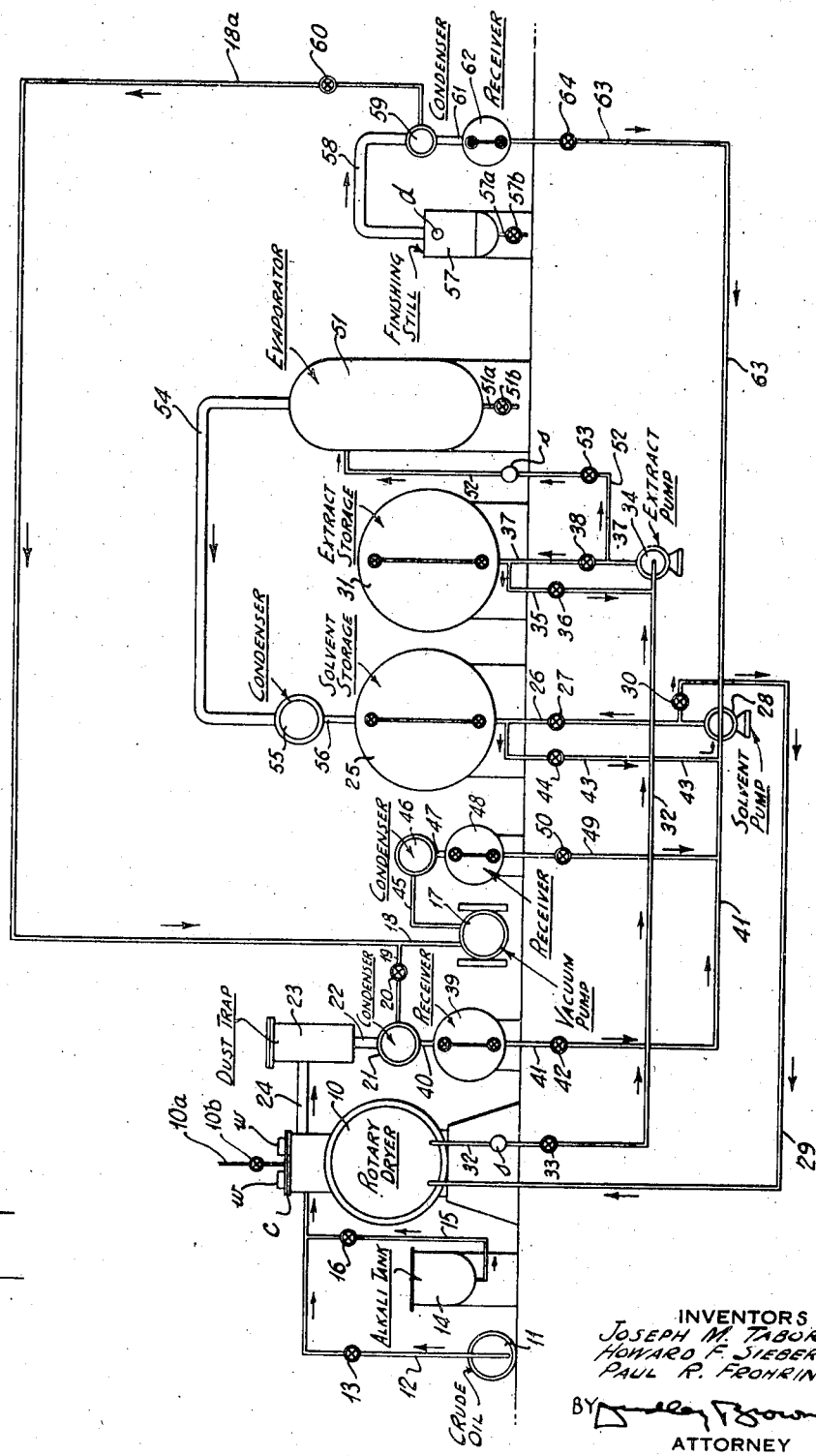

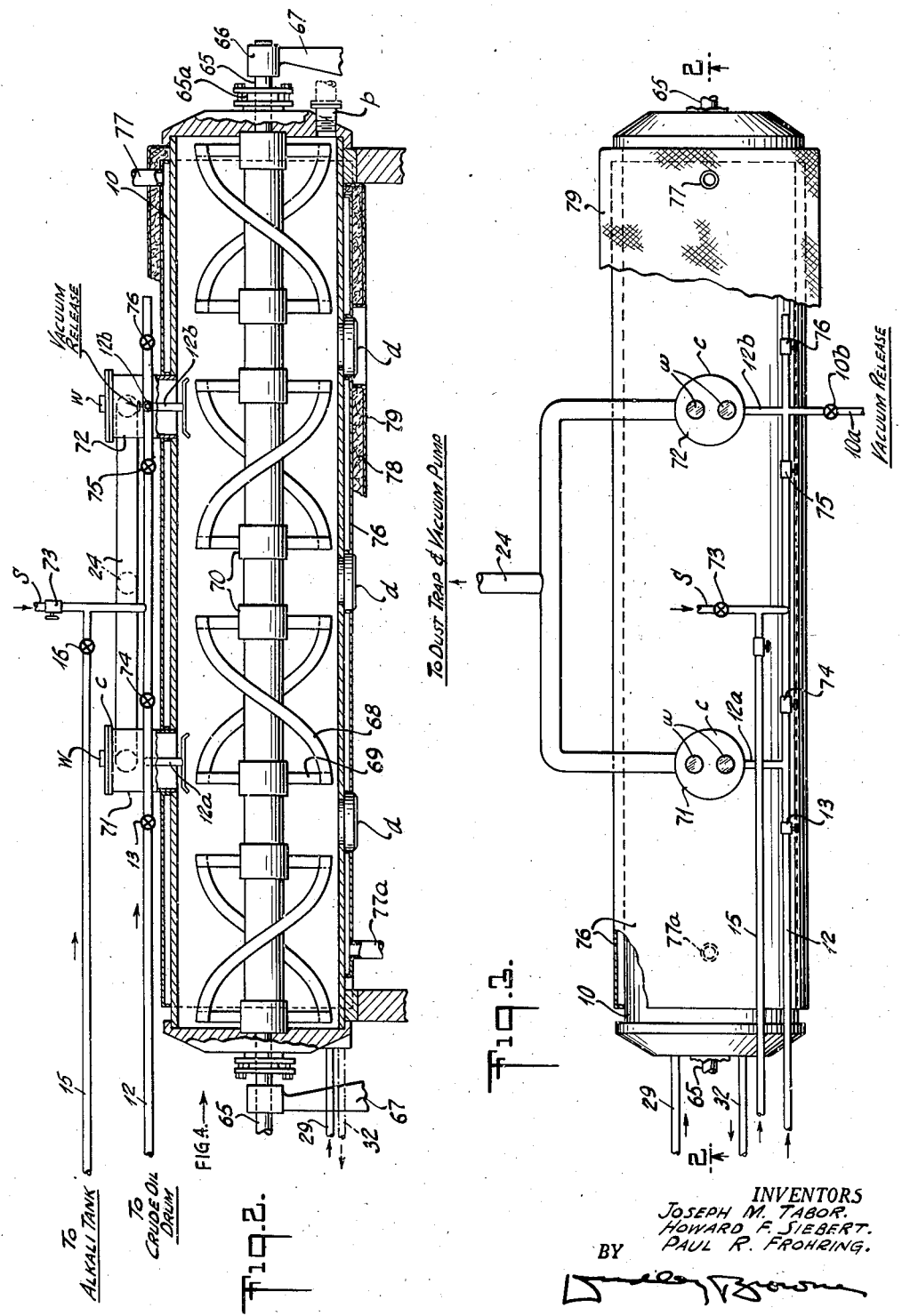

Patented Feb. 8, 1949

2,461,300

UNITED STATES PATENT OFFICE 2,461,300

METHOD OF CONDITIONING A HARD SOAP FOR SOLVENT EXTRACTION

John M. Tabor, East Islip, N. Y., Howard F. Seibert, Mason, Mich., and Paul R. Frohring, Bainbridge, Ohio, assignors to General Biochemicals, Inc., Chagrin Falls, Ohio, a corporation of Ohio Original application October 13, 1943, Serial No. 506,060. Divided and this application August 1, 1945, Serial No. 608,280

1 Claim. (Cl. 260—418)

This invention relates to method and apparatus for extracting pigments, including specifically carotene, and carotinoid pigments, from fatty materials, such, for example, as animal or vegetable oils and fats.

An object of the invention is to provide a simple and efficient method and apparatus for extracting pigments including plant pigments.

Another object of the invention is to provide method and means by which soap lumps formed in the extraction of pigment are powdered and pigment entrapped therein is freed and recovered.

Another object is to provide practical, commercial apparatus comprising a closed fluid system.

Another object of the invention is to provide apparatus comprising a single vessel in which all the treatment steps may be performed, thereby eliminating expensive grinding, drying and transferring equipment and facilitating the reduction of soap lumps due to the retention therein of the heat of reaction resulting from the saponification step.

Other objects will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claim.

The invention will best be understood if the following description is read in connection with the drawings, in which, Figure 1 is a front elevation showing diagrammatically apparatus for carrying out the invention;

Figure 2 is an elevational view, partly in section, of apparatus embodying the invention, the section being taken on the line 2—2 of Figure 3;

Figure 3 is a plan view of the apparatus; and

Figure 4 is an end view looking, in the direction of the arrow shown in Figure 2 and marked "Fig. 4," with the end casing largely broken away to show the interior of the treatment vessel.

In Figures 2, 3, and 4, a single cylindrical vessel or chamber 10 is shown which may be connected successively, to containers for raw material to be extracted, for saponifying material, with a vacuum pump, with a solvent tank, and with an extract tank, if desired, so that all the steps of a pigment extraction operation may be performed in said vessel, and said vessel and the containers to which it is connected may comprise a closed system.

Vessel 10 is stationary and extending through it is a rotatable shaft 65 which is reduced in diameter at its ends which are journalled in bearings 66 supported on the upright support members 67. Between the ends of vessel 10 and the bearings 66 respectively the shaft 65 is provided with and extends through, the stuffing boxes 65a.

Fixedly mounted on shaft 65 are a number of spiral paddle and scraper members 68 secured at their ends to the arms 69 projecting radially from collars 70 secured on shaft 65. It will be noted that shaft 65 is somewhat eccentric with respect to vessel 10 so that the spiral paddle and scraper members in revolving therein with shaft 65 will come very close to the inside of the peripheral wall of vessel 10 at the bottom of the vessel, and will have more clearance at the top of the vessel. The members 68 serve both to agitate the fluid contents of vessel 10, and to scrape and advance solid material, formed or collected, in vessel 10, to the dump doors, $d$, provided in the wall of vessel 10, to discharge the solid material when these doors are opened, as for example for removing soap formed in the vessel by extracting steps performed therein, and, if it is desirable their direction of rotation may be reversed at times to direct material from the extreme ends of vessel 10 toward the dump doors, $d$.

A port $p$ is provided extending through an end wall of vessel 10, preferably just inwardly of the circumferential wall to give access to the interior of vessel 10 and permit a tool to be inserted into the interior of vessel 10, as for example to scrape the inner wall of vessel 10 in cleaning it.

The materials which are to be employed, in vessel 10, for an extracting step for example, may be introduced into vessel 10, preferably by way of towers, 71 and 72, spaced apart longitudinally of vessel 10, through various conduits, and controlled by valve means, to be described. Shaft 65 may be driven by any suitable source of power (not shown) to rotate the members 69 within vessel 10 to agitate the material within the vessel.

The covers, $c$, of towers 71 and 72 are provided at the top with windows, $w$, through which the operator may observe the inside of vessel 10, and, for example, watch a reaction taking place therein while the apparatus is in use so that he may better control it. Thus for example, he may desire to momentarily release a vacuum, drawn on the vessel for reasons to be described, if he observes foaming.

A closed system of which vessel 10 forms the central part, with the related containers and conduits for supplying material to vessel 10, and for receiving material from vessel 10, is diagrammatically illustrated in Figure 1. As shown in Figure 1, vessel 10 is connected with the container 11, which contains the material from which the pigment is to be extracted, by conduit 12, having therein valve 13; with the container 14 for a saponifying agent by conduit 15 which has therein valve 16, and which may discharge into conduit 12 between valve 13 and vessel 10 as illustrated herein; with vaccum pump 17 through vacuum line 18, having the branch line 19, in which valve 20 is provided, and which leads to vacuum condenser 21 which is connected by conduit 22 to the dust trap 23, which in turn is connected with the vessel 10 through vapor line 24; with the solvent storage tank 25 through conduit 43, which has therein the valve 44, and leads to solvent pump 28, and through line 29 which branches off from line 26, through valve 30; and with extract tank 31 through line 32, which has therein valve 33, and line sight s, and communicates with extract pump 34, and through line 37, which has therein valve 38.

A receiver tank 39 is provided interconnected with vacuum condenser 21 by conduit 40 and interconnected with solvent storage tank 25, through line 41, which has the valve 42, through solvent pump 28, and through line 26 which has therein valve 27.

Vacuum pump 17 is also connected to solvent storage tank 25 through exhaust vapor line 45, leading to the atmospheric condenser 46, which is connected by conduit 47 to the receiver 48, which is connected to line 41, through branch line 49, having therein valve 50, through solvent pump 28, and through line 26 which has therein valve 27.

A steam conduit S is connected to conduit 12, intermediate the latter's connections to towers 71 and 72 respectively by branch conduits 12ª and 12ᵇ. Conduit S is controlled by valve 73, and valves 74 and 75 are provided in conduit 12 on either side of its connection to conduit S, and valve 76 is provided in conduit 12 beyond its branch 12ᵇ. Each of the conduits 12ª and 12ᵇ preferably extends downwardly in towers 71 and 72 respectively to just above the rotary path of the paddle and scraper members 68 to facilitate intermixing of the steam with the soap which is formed by the mixture of alkali and fatty material, and the downwardly extending portions of conduits 12ª and 12ᵇ respectively may be branched at the end to further facilitate the mixture of steam with the contents of vessel 10.

In order to heat the interior of vessel 10 to preheat the oil or other fatty material originally introduced into vessel 10, and to later insure complete vaporization of moisture from the soap, vessel 10 preferably comprises a metal casting having a steam jacket 76, which may be integral with vessel 10, and into which steam may be introduced, as through conduit 77, and the resulting condensation may be withdrawn through conduit 77ª, the steam jacket being preferably insulated, as by a wrapping of asbestos 78, retained by a cloth jacket 79, to retard the loss of the heat given to the contents of vessel 10 by, said steam jacket, by steam which is introduced into the vessel to complete vaporization of moisture from the soap, and the heat of reaction of the saponification step.

The above described system constitutes apparatus for carrying out our extraction method which we perform in the single vessel 10 as is described in co-pending application Serial No. 506,060, now Patent No. 2,440,029, of which this application is a division. However, the following further apparatus may conveniently be connected with this system as follows: the evaporator 51 may be connected with extract tank 31 through conduit 52, having valve 53 and line sight s, and branching from line 37 below valve 38, and through extract pump 34, and through conduit 35 which has therein valve 36. As illustrated, conduit 52 is connected with evaporator 51 near its top. At the bottom of evaporator 51 a discharge outlet may be provided, indicated by the conduit 51ª, having in its lower end valve 51ᵇ. Evaporator 51 may be interconnected with solvent storage tank 55 through vapor line 54 leading from the top of the evaporator 51, to atmospheric condenser 55 which in turn is interconnected to solvent storage tank 25 through conduit 56.

In addition to evaporator 51 a finishing still 57 may, if desired, be associated with the above described system, as by vapor line 58 leading from the finishing still 57 to the vacuum condenser 59, which in turn is connected to vacuum pump 17 by vacuum line extension 18ª, which has therein valve 60 and is connected to vacuum line 18, and condenser 59 may be connected through conduit 61 with a receiving tank 62, which in turn is connected to storage tank 25 through the line 63, having therein valve 64, through solvent pump 28 and line 26.

There is thus provided a closed system, which may be exclusive of evaporator 51 and finishing still 57 and their connections to the remainder of the system.

In the operation of our apparatus we may draw into vessel 10, as by means of a partial vacuum drawn on vessel 10 by actuating vacuum pump 17, the raw material from which the pigment is to be extracted, which, for the purpose of exemplification, may consist of a source of carotinoid pigments, such, for example, as melted palm oil, supplied from tank 11 through conduit 12. In order to supply the palm oil to vessel 10 valve 13 is initially opened and is closed when the desired volume of palm oil has been discharged into vessel 10. In a like manner, when communication is desired between vessel 10 and any of the elements of the system, the valve means for the element, described above, will be utilized to control the flow to or from vessel 10. Thus we may next similarly draw into vessel 10 from tank 14, through conduits 15 and 12, after closing valve 13 and opening valve 16, an amount of a fifty percent aqueous caustic alkali which is chemically equivalent to, or preferably somewhat in excess of, the amount of melted palm oil drawn into vessel 10. The caustic alkali reacts with the oil causing saponification of the oil, as is well understood in the art, and we preferably promote this reaction by maintaining agitation in the vessel 10 during the entire saponification period.

The oil or fatty material, which is the first material drawn into vessel 10, may be preheated, as for example, by admitting steam to steam jacket 76. Then alkali is introduced to saponify the oil or other fatty material.

The saponification reaction steps release an amount of heat sufficient to heat the soap masses or lumps which are formed, and in which a substantial amount of pigment material is entrapped, to vaporize the moisture in the newly formed soap lumps thus materially aiding in the drying and consequent progressive breaking up of the lumps which continues until the soap is in the form of granules which may be on the order of 100 mesh. The temperature in vessel 10 at atmospheric pressure is raised, by the aforesaid preheating and by the heat of reaction to a degree which promotes rapid decomposition of the pigment being extracted. During this step and also succeeding steps we protect the pigment being extracted from such decomposition. We accomplish this by lowering and regulating the temperature in vessel 10 by controlling the degree of vacuum in vessel 10. The degree of vacuum necessary can be estimated from the decomposition point of the material which it is desired to extract. Thus, for example, carotene decomposes rapidly at temperatures above 80° C. Accordingly the saponification pressure for carotene bearing oils should be kept, during the saponification step, at a pressure sufficiently less than atmospheric pressure to insure the maintainance of a boiling temperature less than 80° C. For example successful results have been obtained using a vacuum of about twenty-five inches (roughly a pressure of 125 millimeters of mercury), but in any event the pressure should not be allowed to exceed 355 millimeters of mercury, under which pressure water boils at 80° C. In the process of treating palm oil or other fatty material which will give a hard soap the pressure varies due to the interaction of alkali with glycerides and therefore cannot be stated in definite terms.

The employment of reduced pressures has the further advantages that it results in the exclusion from vessel 10 of air the presence of which would be detrimental since it would promote decomposition by oxidation of the carotene or other pigment being extracted, and facilitates the breaking down of newly formed soap lumps and the consequent freeing therefrom, and the recovery of, pigment containing material, as well as of free alkali and oil which may become entrapped in the soap lumps.

Depending upon the characteristics of the particular kind of material or oil to be treated we have found, as stated above, that it is some times desirable to employ somewhat more of the alkali solution than is required to provide an amount which is the exact chemical equivalent of the amount of the oil or other fatty material being treated. We have found that certain oils have a tendency to form a soft soap, and that a harder soap, and one having better powdering characteristics, may be obtained by using an amount of alkali solution which is greater than the chemical equivalent of the particular oil or other fatty material being treated, the increased amount, over and above the chemical equivalent amount, being determinable by experimentation in each case. Thus, for example, we have found that in the treatment of palm oil we obtain very satisfactory results employing twenty percent more of the aforesaid fifty percent aqueous caustic alkali than is necessary for chemical equivalency with the amount of palm oil being treated.

In the operation of the apparatus set forth herein the vessel 10 may be initially heated, as by filling steam jacket 76 with steam to preheat the oil which is first drawn into vessel 10, but the supply of steam to the steam jacket is preferably terminated before the alkali is drawn into vessel 10, thus initiating the saponification step.

Saponification proceeds as soon as contact between the oil and the alkali is made, and the alkali should be distributed as evenly as possible throughout the oil because, if even distribution is not obtained, heavy balls of soap may form which in addition to being slow and difficult to break up, may impede and interfere with the rotation of members 68. As stated above, we provide one or more windows $w$ in the covers $c$ of the towers or domes 71 and 72 of vessel 10 through which the operator may watch the reaction closely, and if he observes any tendency of the mixture to foam he should release the vacuum momentarily, as by opening vacuum release valve 10$^b$ which communicates with the interior of vessel 10 through line 10$^a$.

During the saponification step the heat in vessel 10 resulting from the reaction of the oil and alkali, and increased by the preheating step which is preferably employed, is sufficient to flash off the water in which the alkali was dissolved and the reduced pressure employed facilitates the flashing off of the water including that which is progressively released from the soap lumps as they divide and disintegrate into smaller lumps. The water vapor is withdrawn through vapor line 24, dust trap 23, and line 22, into condenser 21 where it is condensed, and may be drawn off, through an outlet, not shown, and discarded, when the saponification step is completed. The soap, at the end of the saponification step is in a very dry and finely powdered condition which requires no further processing before the pigment is extracted.

When the saponification step is complete and the soap has been completely powdered, agitation within vessel 10 is discontinued and a solvent, such, for example, as one of a group comprising benzene, nitrobenzene, ethylene dichloride, and petroleum ether, is drawn directly into the vessel 10 from the solvent storage tank 25 through conduits 43 and 29, as described above. Enough solvent is added to bring the level thereof, in vessel 10, up to the top of the rotary path of the paddle and scraper members 68 therein. The vacuum at this time is discontinued and agitation is recommenced and continued for approximately fifteen minutes or until the soap is thoroughly wetted. When the solvent and soap have been intimately mixed, agitation is discontinued and the soap and the extract bearing solvent are allowed to separate by gravity. When a solvent is used which has a specific gravity greater than soap the clear extract bearing solvent is drawn off into the extract storage tank 31 through conduits 32 and 37, and pump 34, as described above. When the solvent employed has a specific gravity less than the soap, taps will be provided to draw the solvent from the top of the vessel.

When the extract bearing solvent being withdrawn becomes cloudy as seen through line sight $s$ in line 32, the withdrawal should be stopped.

When all the clear extract bearing solvent has been drawn out of vessel 10, fresh solvent for another wash may be drawn into vessel 10, in the manner set forth above, and agitation is resumed for approximately fifteen minutes or until the remaining soap is again thoroughly wetted with solvent, after which the agitation is stopped, the soap and the extract bearing solvent are again allowed to separate, and, after separation, the extract bearing solvent is drawn off again, as described above.

The extracting step may be repeated in this way as many times as economy of time and material permit.

After the additional washing steps, which comprise reintroducing solvent, mixing it with the soap in vessel 10, separating the soap and the extract bearing solvent, and separately withdrawing the extract bearing solvent, have been repeated the desired number of times, the vacuum pump 17 is started again and the vacuum condition within vessel 10 is restored and the soap is dried under vacuum, vessel 10 being preferably heated at the same time, as by admitting steam to jacket 76, to further the complete vaporization of moisture from the soap. When the solvent stops distilling from the soap, dry steam is introduced into vessel 10, through conduit S, controlled by valve 73 and branched conduits 12$^a$ and 12$^b$, agitation being continued to insure mixing of the steam and soap, and the last traces of solvent are removed from the soap by steaming for a short period, on the order of five minutes, while under vacuum, thereby further drying the extracted soap. The solvent separated by the steaming step is recovered in the vacuum and atmospheric condensers 21 and 46 respectively from which it is returned to solvent storage tank 25 as described above.

During the step of drying the soap remaining in dryer 10 after the last wash the operator should be on guard to detect and prevent foaming and should momentarily release the vacuum in vessel 10 by opening vacuum release valve 10$^a$ if foaming occurs.

After the extraction of the pigment from the oil, as described above, has been completed, the soap, which is now powdered and substantially pigment free, is removed from vessel 10, through dump doors $d$ which are opened for this purpose. The soap above the doors falls through the doors and is discharged, and the spiral members 68 are continuously revolved while vessel 10 is being emptied to move the soap to the dump doors. The cycle of treatment in vessel 10 is complete when the soap has been discharged, and a new batch of oil may now be drawn into vessel 10 and the cycle repeated.

If it is desired to concentrate the extract collected in storage tank 31 it may be pumped into evaporator 51 through conduit 52 after opening valves 36 and 53 in lines 35 and 52 respectively and closing valves 38 and 33 in lines 37 and 32 respectively. Care should be taken to prevent any soap from coming into the evaporator 51. Any soap which may have gotten into tank 31 will separate by gravity and the extract may then be decanted from tank 31 by drawing from the top of the vessel in the case of lighter solvents, or from the bottom of the vessel in the case of the heavier solvents. Any soap which has found its way into tank 31 may therefore be retained therein and returned to vessel 10 in the first wash of the following batch of material being treated.

After concentration in evaporator 51 the extracts may be withdrawn, as by opening valve 51$^b$, and cooled. At this stage the extracts will retain a certain amount of soap which we filter out, as for example, by the use of Buchner funnels, using a liberal amount of filter aid, and we thereafter wash the resulting filter cake thoroughly with fresh solvent and transfer the combining filtrates into finishing still 57 where a final concentration step may be performed under vacuum, drawn by vacuum pump 17 through vacuum lines 18 and 18$^a$, as by steam distilling said filtrates, with dry steam introduced into still 57, as by an inlet $d$, for about five minutes to remove the last traces of solvent. Vapor released during this step is removed through vapor line 58 to the vacuum condenser 59, from which the recovered solvent is discharged into receiver 62, from which it may be returned to solvent storage tank 25 through return line 63, as described above.

The final concentrate may be withdrawn from still 57 through an outlet conduit 57$^a$ controlled by valve 57$^b$. The extract at this point should be handled very carefully since excess heat and air are very detrimental. It should be run into suitable containers and sealed under nitrogen, the containers being completely filled so as to leave the minimum possible air space, and nitrogen should be bubbled through the solution to insure complete displacement of air just before sealing.

We have found that in treating 1000 lbs. of melted palm oil, in the apparatus and according to the method described above, the soap masses or lumps formed by the reaction of the oil and alkali will start to crumble in about twenty minutes after the alkali has been added, and the division and crumbling of the lumps of soap will continue progressively and the soap will be completely pulverized after about an hour and fifteen minutes. The reduced pressure employed within the treatment chamber together with the heat of reaction of the saponifying step creates a great temperature differential between the inside and the outside of the soap lumps, and the vaporizing of the internally contained water thus breaks up or explodes the lumps while they are hot and readily breakable, thus freeing an amount of pigment which may represent on the order of twenty percent of the total yield.

For each solvent wash approximately fifteen minutes is required until the soap is thoroughly wetted. The step of drying the soap, formed as a by-product of the extraction, requires on the order of four hours when using in vessel 10 a vacuum of approximately 26 inches of mercury, roughly corresponding to 100 millimeters of pressure. The over-all time required for the treatment of 1000 lbs. of palm oil from start to finish is about fourteen and a half hours.

One operator can readily control the apparatus and carry out the operation of the system. During the drying period he may, if desired, use his time for filtering the extracts, after they have been concentrated in evaporator 51, say to approximately ten gallons for a batch of 1000 lbs. of palm oil.

The over-all yield of pigment obtained with the apparatus, and by the method disclosed herein, is high, being from 80% to 90% in the case of carotene extracted from palm oil. This result is due in large part to the reduction of the lumps as explained above, thus permitting the pigment contained in the lumps to be freed and recovered.

It will thus be seen that there have been provided by this invention apparatus and method by which the various objects hereinabove set forth together with many thoroughly practical advantages are successfully achieved. As various possible embodiments might be made of the mechanical features of the above invention, and as the art herein described might be varied in various parts, all without departing from the scope of the invention, it is to be understood that all matter hereinbefore set forth or shown in the accompanying drawings is to be interpreted as illustrative and not in a limiting sense.

What we claim is:

In a method of conditioning a hard soap for solvent extraction, which soap is formed by aqueous-alkaline saponification of a fatty oil containing unsaponifiable oil-soluble pigment material, the improved step which comprises: mixing fatty oil and an excess of aqueous alkali under vacuum in a closed saponification zone, continuously agitating the saponification mixture, continuously maintaining a pressure in the saponification zone not exceeding 355 mm. of mercury throughout the saponification by continuously exhausting gases and vapors therefrom, and continuing said agitation and the maintenance of said sub-atmospheric pressure until the soap formed is substantially dry, whereby the heat of saponification is utilized to boil off water entrapped in soap lumps formed during saponification at a temperature substantially below the normal boiling point of water and the lumps are thus disrupted and comminuted and the soap is made accessible to the solvent.

JOSEPH M. TABOR.
HOWARD F. SEIBERT.
PAUL R. FROHRING.

REFERENCES CITED

The following references are of record in the file of this patent:

UNITED STATES PATENTS

| Number | Name | Date |
|---|---|---|
| 1,338,698 | Richardson | May 4, 1920 |
| 1,807,232 | Wurster et al. | May 26, 1931 |
| 1,813,575 | Janecke et al. | July 7, 1931 |
| 1,919,229 | Lovett | July 25, 1933 |
| 2,031,991 | Ungnade et al. | Feb. 25, 1936 |
| 2,170,872 | Peebles | Aug. 29, 1939 |
| 2,324,195 | Carlson et al. | July 13, 1943 |
| 2,266,830 | Taylor | Dec. 23, 1941 |
| 2,271,406 | Thurman | Jan. 17, 1942 |
| 2,318,747 | Buxton | May 11, 1943 |
| 2,318,748 | Buxton | May 11, 1943 |
| 2,383,631 | Trent | Aug. 28, 1945 |